US012712913B2

(12) United States Patent
Li et al.

(10) Patent No.: US 12,712,913 B2
(45) Date of Patent: Aug. 18, 2026

(54) MACHINE LEARNING FOR VISUAL SIMILARITY-BASED PHISHING DETECTION

(71) Applicant: Fortinet, Inc., Sunnyvale, CA (US)

(72) Inventors: Haitao Li, Coquitlam (CA); Lisheng Ryan Sun, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 94 days.

(21) Appl. No.: 18/125,916

(22) Filed: Mar. 24, 2023

(65) Prior Publication Data

US 2023/0231879 A1 Jul. 20, 2023

Related U.S. Application Data

(63) Continuation-in-part of application No. 16/583,707, filed on Sep. 26, 2019, now abandoned.

(51) Int. Cl.
*H04L 9/40* (2022.01)

(52) U.S. Cl.
CPC ................................ *H04L 63/1483* (2013.01)

(58) Field of Classification Search
CPC .................................................. H04L 63/1483
See application file for complete search history.

(56) References Cited

U.S. PATENT DOCUMENTS 8,495,735 B1 * 7/2013 Warner ............... H04L 63/1483 709/225
8,984,640 B1 3/2015 Emigh
9,292,493 B2 * 3/2016 Chandramouli .... H04L 63/1416
10,129,276 B1 * 11/2018 Raviv ................. H04L 63/1441
10,834,128 B1 * 11/2020 Rajagopalan ......... H04L 51/212
10,904,286 B1 * 1/2021 Liu ....................... H04L 9/3236
11,146,576 B1 * 10/2021 Mushtaq ............. H04L 63/1416
12,021,894 B2 * 6/2024 Clausen .............. H04L 63/1416
12,238,138 B2 * 2/2025 Zverkov ............ G06V 10/7635
2008/0172738 A1 * 7/2008 Bates ...................... H04L 61/30 726/22
2008/0235103 A1 * 9/2008 Baccas ................... G06Q 30/06 705/347
2011/0283361 A1 11/2011 Perdisci
2012/0227104 A1 * 9/2012 Sinha .................. H04L 63/0227 709/206
2015/0067839 A1 * 3/2015 Wardman ............... G06Q 10/10 726/22
2018/0063190 A1 * 3/2018 Wright ................ H04L 63/1425
2018/0343283 A1 11/2018 Goutal
2020/0036751 A1 1/2020 Kohavi
2020/0226214 A1 7/2020 Reddekopp (Continued)

*Primary Examiner* — Khang Do
(74) *Attorney, Agent, or Firm* — Law Office of Dorian Cartwright; Dorian Cartwright

(57) ABSTRACT

In one embodiment, a similarity index is calculated from characteristics of a suspected phishing web page to a database of known phishing web pages. The characteristics derive from both HTML tags of the suspected phishing web page and a screenshot of the suspected phishing web page. With machine learning using the similarity index as an input, a probability is estimated that the suspected web page comprises a known phishing web page from the database of known phishing web pages. A known phishing web page is selected from one or more candidates known phishing web pages, based on having a highest probability.

12 Claims, 6 Drawing Sheets

(56) References Cited

U.S. PATENT DOCUMENTS

| | | | | |
|---|---|---|---|---|
| 2020/0311790 | A1 | 10/2020 | Keren | |
| 2020/0314122 | A1* | 10/2020 | Jones | H04L 63/1483 |
| 2020/0366712 | A1* | 11/2020 | Onut | H04L 63/1416 |
| 2020/0409988 | A1 | 12/2020 | Singh | |
| 2021/0099484 | A1* | 4/2021 | Li | G06F 16/2255 |
| 2021/0176274 | A1* | 6/2021 | Ben David | H04L 63/1433 |
| 2021/0203693 | A1* | 7/2021 | Clausen | H04L 63/1425 |
| 2021/0248624 | A1* | 8/2021 | Keren | G06Q 50/184 |
| 2022/0030029 | A1* | 1/2022 | Kagan | G06F 21/44 |
| 2022/0070216 | A1* | 3/2022 | Kohavi | H04L 63/1416 |
| 2022/0385694 | A1* | 12/2022 | Zverkov | G06V 10/44 |
| 2023/0033134 | A1* | 2/2023 | Kurrasch | H04L 63/20 |
| 2023/0082481 | A1* | 3/2023 | Azarafrooz | H04L 63/0281<br>726/23 |
| 2023/0231879 | A1* | 7/2023 | Li | H04L 63/1416<br>726/22 |
| 2023/0262078 | A1* | 8/2023 | Rozhnov | H04L 9/40<br>726/1 |
| 2023/0344866 | A1* | 10/2023 | Shao | G06F 21/552 |
| 2023/0353595 | A1* | 11/2023 | Hu | G06N 3/045 |
| 2024/0114053 | A1* | 4/2024 | Katz | H04L 63/1483 |
| 2024/0161038 | A1* | 5/2024 | Sloane | G06Q 10/0635 |
| 2024/0195836 | A1* | 6/2024 | Gardezi | H04L 63/1483 |
| 2024/0202405 | A1* | 6/2024 | Lang | G06F 30/27 |
| 2024/0250987 | A1* | 7/2024 | Annapureddy | H04L 63/1483 |
| 2025/0088535 | A1* | 3/2025 | Li | G06F 40/279 |

* cited by examiner

FIG. 2

```
<html>
<head>
        <title></title>
        <meta http-equiv="Content-Type" content="text/html; charset=utf-8" />
        <meta http-equiv="X-UA-Compatible" content="IE=edge" >
        <meta http-equiv="Pragma" content="no-cache" />
        <meta http-equiv="Cache-Control" content="no-cache, must-revalidate" />
        <meta http-equiv="Expires" content="0" />
</head>
<body>
</body>
<script>
        window.location.href = "/doc/page/login.asp?_" + (new Date()).getTime();
</script>
<div class="footer" id="footer">©2017 Hikvision Digital Technology Co., Ltd. All Rights
Reserved.</div>
</html>
```

FIG. 3

MACHINE LEARNING FOR VISUAL SIMILARITY-BASED PHISHING DETECTION

FIELD OF THE INVENTION

The application claims priority under 35 USC 120 as a continuation-in-part to U.S. patent application Ser. No. 16/583,707, by Haitao Li and entitled Phishing Website Detection, the contents of which are hereby incorporated by reference in its entirety.

FIELD OF THE INVENTION

The invention relates generally to computer networks, and more specifically, to wirelessly managing connections with Wi-Fi 6E clients, for web site phishing detection using machine learning of web site similarity without dependence on web site similarity thresholds.

BACKGROUND

Phishing is one of the major problems faced by the cyberworld and leads to financial losses for both industries and individuals. Detection of phishing attack with high accuracy has always been a challenging issue. At present, visual similarities based techniques are very useful for detecting phishing websites efficiently. Phishing website looks very similar in appearance to its corresponding legitimate website to deceive users into believing that they are browsing the correct website. Visual similarity based phishing detection techniques utilize the feature set like text content, text format, Hyper Text Markup Language (HTML) tags, Cascading Style Sheet (CSS), image, and so forth, to make the decision.

These traditional approaches compare the suspicious website with the corresponding known phishing website by using individual feature, and if the similarity is greater than the predefined threshold value then it is declared phishing. They are effective in many cases but still have drawbacks. First, it is challenging to choose a perfect threshold manually even for experts. Moving the threshold up or down by one will have a huge effect on the number of false positives or false negatives generated. Second, single feature may fail on detection. For example, HTML-based detection may fail if a hacker deliberately injects some randomly generated codes to HTML while still keeps webpage looking the same.

What is needed is a robust technique for web site phishing detection using machine learning of web site similarity without dependence on web site similarity thresholds, to prevent far away connections.

SUMMARY

To meet the above-described needs, methods, computer program products, and systems for web site phishing detection using machine learning of web site similarity without dependence on web site similarity thresholds.

In one embodiment, a similarity index is calculated from characteristics of a suspected phishing web page to a database of known phishing web pages. The characteristics can derive from both HTML tags of the suspected phishing web page and a screenshot of the suspected phishing web page. With machine learning using the similarity index as an input, a probability is estimated that the suspected web page comprises a known phishing web page from the database of known phishing web pages. A known phishing web page is selected from one or more candidates known phishing web pages, based on having a highest probability.

In another embodiment, it is determined if the selected phishing web page exceeds a probability threshold. Responsive to exceeding the probability threshold, a security action is taken to prevent actuation of the web page.

Advantageously, network performance and computer performance are improved with more stringent security standards.

BRIEF DESCRIPTION OF THE DRAWINGS

In the following drawings, like reference numbers are used to refer to like elements. Although the following figures depict various examples of the invention, the invention is not limited to the examples depicted in the figures.

Figure 2:
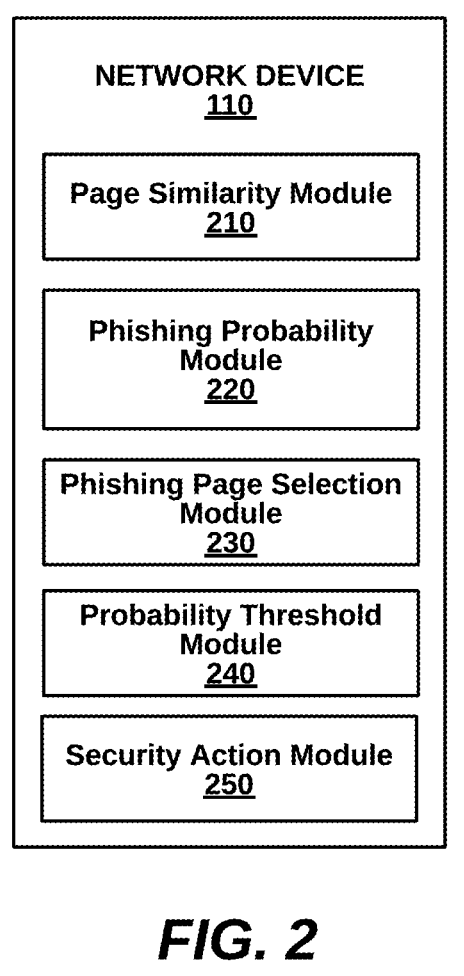

FIG. 2 is a more detailed block diagram illustrating a network device of the system of FIG. 1, according to one embodiment.

FIG. 3 is a sample listing of HTML source code with HTML tags used to calculate similarity, according to an embodiment.

DETAILED DESCRIPTION

Methods, computer program products, and systems for web site phishing detection using machine learning of web site similarity without dependence on web site similarity thresholds. One of ordinary skill in the art will recognize many alternative embodiments that are not explicitly listed based on the following disclosure.

I. Systems for Machine Learning Phishing Detection (FIGS. 1-3)

Figure 1:
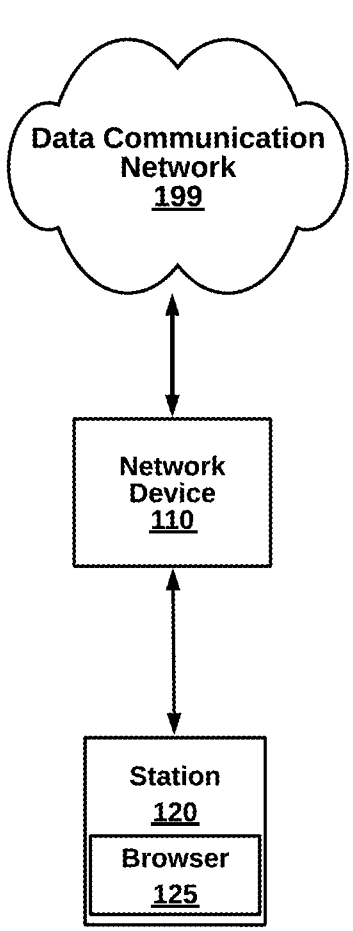
FIG. 1 is a high-level block diagram illustrating a system for web site phishing detection using machine learning of web site similarity without dependence on web site similarity thresholds, according to one embodiment.

FIG. 1 is a high-level block diagram illustrating a system 100 for web site phishing detection using machine learning of web site similarity without dependence on web site similarity thresholds, according to one embodiment. The system 100 includes a network device 110 coupled to a data communication network 199 and a station 120. Other embodiments of the system 100 can include additional components that are not shown in FIG. 1, such as controllers, network gateways, firewalls, and additional access points and non-Wi-Fi 6E stations.

In one embodiment, the components of the automatic system 100 are coupled in communication over a private network connected to a public network, such as the Internet. In another embodiment, system 100 is an isolated, private network. The components can be connected to the data communication system via hard wire (e.g., network device 110). The components can also be connected via wireless networking (e.g., station 120). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or IPv6 address spaces.

The network device 110 examines data packets sent downstream from the data communication network for potential phishing. In another embodiment, data packets sent from the station 120 are examined for sending out phishing. The network device 110 can be a firewall device, an access point, a Wi-Fi controller, or the station 120 itself.

The station 120 further comprises a web browser 125 to display web pages. In some cases, the web pages are displayed within a different web application with web functionality built-in, such as a word processor or a PDF application. The web browser 125 uses HTML received to compose a web page for display to a user. In other embodiments, Extensible Markup Language (XML), JavaScript, Java or other types of web source code can be used to program all or a portion of web pages, and analyzed with the techniques herein. The web browser 125 can be, for example, Google Chrome, Internet Explorer or Edge, Mozilla, or the like, having the components of FIG. 2.

To determine whether a web page is a phishing web page, the network device 110 combines HTML similarity and screenshot similarity into a Bayesian Classifier, in one embodiment.

1) HTML Similarity

First, a webpage can be represented using a set of strings by combining three consequent tags. As shown in FIG. 1, tags <html> <head> <title> <meta> <meta> <meta> <meta> <body> <script> <div> are transformed to a set of strings by combining three consequent set tags ["html head title","head title meta","title meta meta","meta meta meta","meta meta body","meta body script","body script div"].

Then, a Jaccard similarity coefficient, in one embodiment, to calculate the similarity of a website with phishing websites. Let U be a set and A and B be subsets of U, then the Jaccard coefficient is defined to be the ratio of the number of elements of their intersections and the number of elements of their union:

$$J(A, B) = \frac{A \cap B}{A \cup B}$$

This value is 0 when the two sets are disjoint, 1 when they are equal, and strictly between 0 and 1 otherwise. Two sets are more similar (i.e., have relatively more members in common) when their Jaccard index is closer to 1. The set tags of a webpage can be used to match that of known phishing websites to get a small set of phishing websites which have closest Jaccard coefficient to it.

Finally, this continuous variable is converted into a discrete one so that it can be used in our classier. By splitting up it into bins, e.g., (0-0.1)→0, (0.1,0.2)→1, . . . (0.9,1.0) →9, it will become a discrete value in {0,1, . . . 9}, denoted as the similarity_tag.

2) Screenshot Similarity

First, we convert webpage screenshot into a perceptual hashing value. A perceptual hash is a type of locality-sensitive hash, which is analogous if features of the multimedia are similar. There are a variety of image perceptual hashing algorithms, such as Average Hashing (aHash), Median Hashing (mHash), Difference Hashing (dHash). We use dHash method for example, which can be done in flowing steps: (1) Convert the image to grayscale; (2) Downsize it to a 9×9 thumbnail; (3) Produce a 64-bit "row hash": a 1 bit means the pixel intensity is increasing in the x direction, 0 means it's decreasing; (4) Do the same to produce a 64-bit "column hash" in the y direction; and (5) Combine the two values to produce the final 128-bit hash value.

Then, Hamming distance is employed to calculate similarity of the dHash of a webpage screenshot with that of phishing websites. The Hamming distance between two strings of equal length is the number of positions at which the corresponding symbols are different, which can be written as: Hamming distance=($dHash_1$^ $dHash_1$).count('1') and denoted as similarity_ss.

3) Bayesian Classifier

In one embodiment, the Bayes Classifier outputs probabilities to classify a webpage phishing or not. These probabilities also can be regarded as the similarities or dissimilarities that given web pages have with the phishing webpage. Given a problem instance to be classified, represented by a vector $X=(x_1, x_2, \ldots, x_n)$representing some n features, Bayes classifier assigns to this instance probabilities $p(C_k|x_1, x_2, \ldots, x_n)$ for each of K possible classes $C_k$. Using Bayes' theorem, the conditional probability can be decomposed as $$p(C_k \mid X) = \frac{p(C_k)p(X \mid C_k)}{p(X)}.$$

In this case K=2, $C_0$=Not Phishing, $C_1$=Phishing; n=2, $x_1$=similarity_tag, $x_2$=similarity_ss. Our classifier can easily apply to cases with more features (n>2). A list (similarity_tag, similarity_ss) is output from which the highest probability is chosen. If the probability $p(C_k|X)$ exceeds a predefined threshold $\theta_T$, the webpage is classified as phishing; otherwise, the web page is classified as normal.

FIG. 2 is a more detailed block diagram illustrating the network device 120 of the system of FIG. 1, according to one embodiment. The network device 110 includes a page similarity module 210, a phishing probability module 220, a phishing page selection module 230, a probability threshold module 240, and a security action module 250. The components can be implemented in hardware, software, or a combination of both.

The page similarity module 210 to calculate a similarity index from characteristics of a suspected phishing web page to a database of known phishing web pages, wherein the characteristics derive from both HTML tags of the suspected phishing web page and a screenshot of the suspected phishing web page.

The phishing probability module 220 to estimate, with machine learning using the similarity index as an input, a probability that the suspected web page comprises a known phishing web page from the database of known phishing web pages.

The phishing page selection module 230 to select a known phishing web page from one or more candidate known phishing web pages, based on having a highest probability.

The probability threshold module 240 to determine if the selected phishing web page exceeds a probability threshold.

The security action module 250 to, responsive to exceeding the probability threshold, take a security action to prevent actuation of the web page.

II. Methods for Machine Leaning Phishing Detection (FIGS. 4-5)

Figure 4:
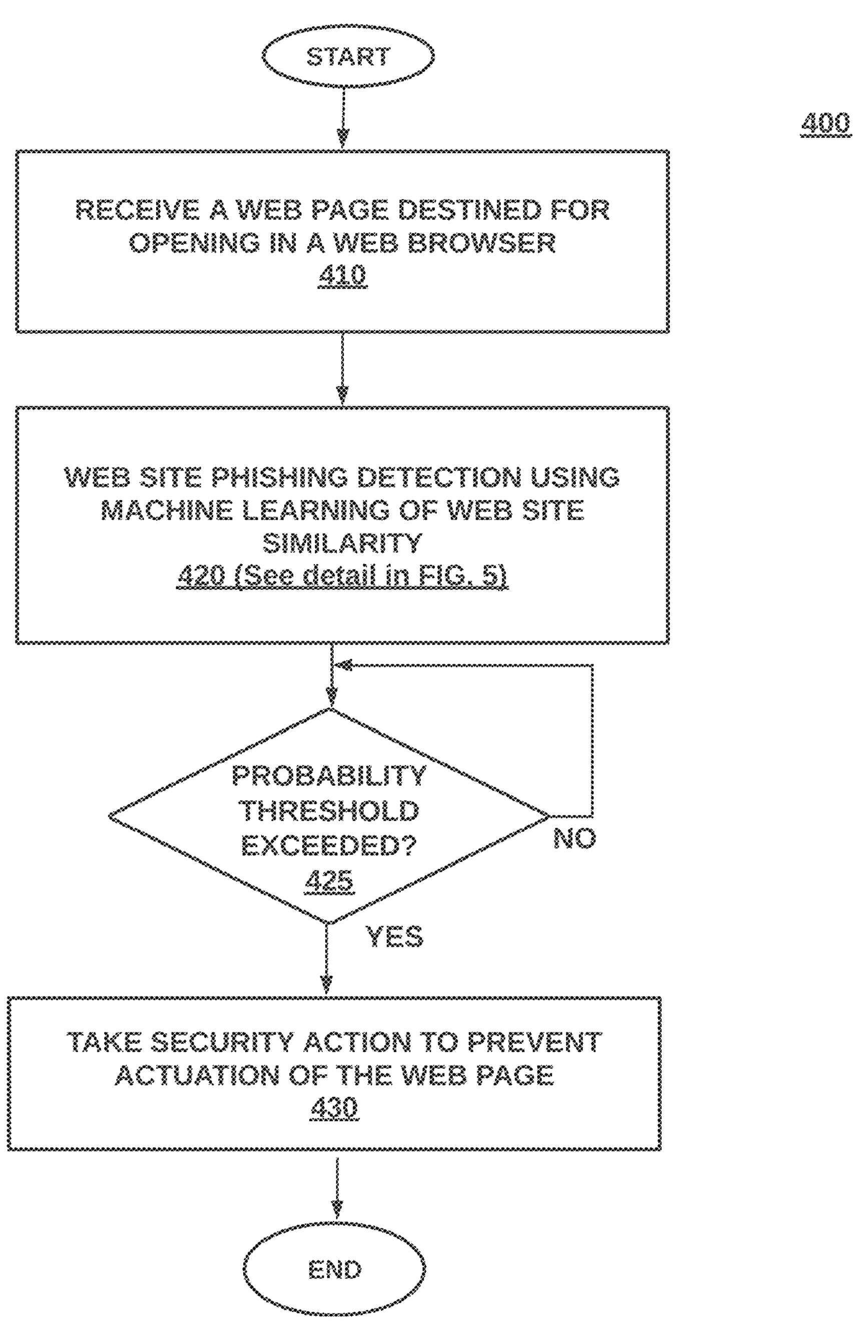
FIG. 4 is a high-level flow diagram illustrating a method for protecting browser users from web site phishing, according to one embodiment.

FIG. 4 is a high-level flow diagram illustrating a method 400 for protecting browser users from web site phishing, according to one embodiment. The method 300 can be implemented by, for example, system 100 of FIG. 1.

At step 410, a web page destined for opening in a web browser is received. At step 420, web site phishing detection using machine learning of web site similarity without dependence on web site similarity thresholds, as detailed further in FIG. 5. At step 430, responsive to exceeding the probability threshold, a security action is taken to prevent actuation of the web page.

Figure 5:
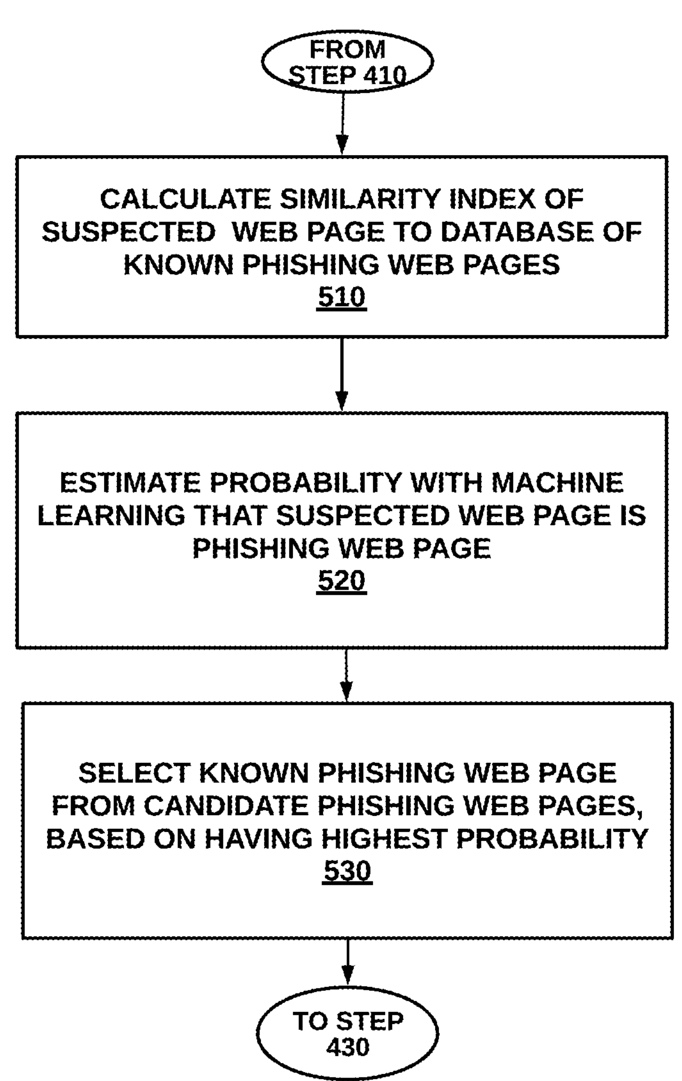
FIG. 5 is a more detailed flow diagram illustrating a step for web site phishing detection using machine learning of web site similarity without dependence on web site similarity thresholds, from the method of FIG. 4, according to an embodiment.

FIG. 5, provides more detail for the web site phishing detection step. More specifically, at step 510, a similarity index is calculated from characteristics of a suspected phishing web page to a database of known phishing web pages, wherein the characteristics derive from both HTML tags of the suspected phishing web page and a screenshot of the suspected phishing web page.

At step 520, with machine learning using the similarity index as an input, a probability is estimated that the suspected web page comprises a known phishing web page from the database of known phishing web pages.

At step 530 a known phishing web page is selected from one or more candidate known phishing web pages, based on having a highest probability.

III. Computing Device for Machine Learning Phishing Detection (FIG. 6)

Figure 6:
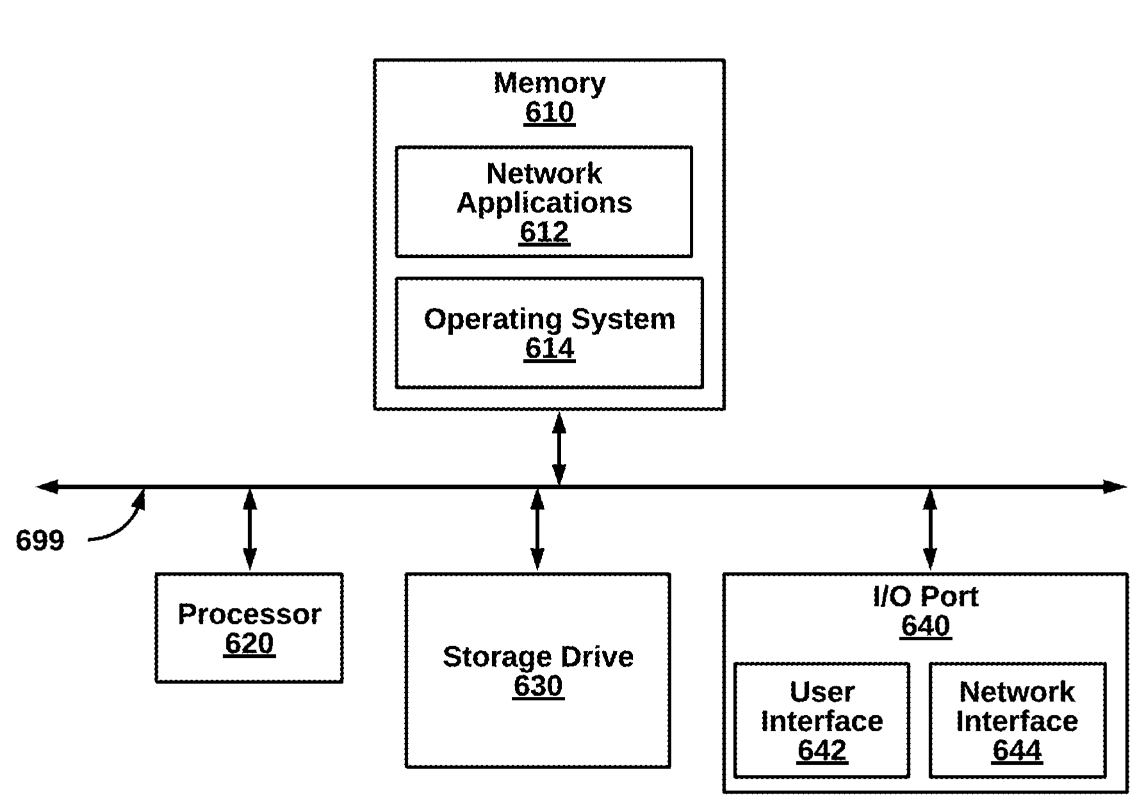
FIG. 6 is a block diagram illustrating an example computing device for the system of FIG. 1, according to one embodiment.

FIG. 6 is a block diagram illustrating a computing device 600 for use in the system 100 of FIG. 1, according to one embodiment. The computing device 600 is a non-limiting example device for implementing each of the components of the system 100, including the network device 110 and the station 120. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications 612 can include a web browser (e.g., browser 125), a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a network device for web site phishing detection using machine learning of web site similarity without dependence on web site similarity thresholds, the method comprising:

calculating a similarity index from characteristics of a suspected phishing web page to a database of known phishing web pages, wherein the characteristics derive from both Hyper Text Markup Language (HTML) tags of the suspected phishing web page and a screenshot of the suspected phishing web page;

estimating, with machine learning using the similarity index as an input, a probability that the suspected web page comprises each of one or more candidate known phishing web pages from the database of known phishing web pages;

selecting a known phishing web page from the one or more candidate known phishing web pages, based on having a highest probability, among the one or more candidate known phishing web pages, that the suspected web page comprises the known phishing web page;

determining if the estimated probability of the selected phishing web page exceeds a probability threshold; and responsive to exceeding the probability threshold, taking a security action to prevent actuation of the phishing web page.

2. The method of claim 1, wherein the estimated probability is from a Bayesian Classifier.

3. The method of claim 1, wherein the similarity index calculation is based at least in part on a Jaccard similarity coefficient.

4. The method of claim 1, wherein the estimated probability is based at least in part on a Hamming distance.

5. A non-transitory computer-readable medium storing source code in a network device that, when executed by a processor, performs a method for web site phishing detection using machine learning of web site similarity without dependence on web site similarity thresholds, the method comprising:

calculating a similarity index from characteristics of a suspected phishing web page to a database of known phishing web pages, wherein the characteristics derive from both Hyper Text Markup Language (HTML) tags of the suspected phishing web page and a screenshot of the suspected phishing web page;

estimating, with machine learning using the similarity index as an input, a probability that the suspected web page comprises each of one or more candidate known phishing web pages from the database of known phishing web pages;

selecting a known phishing web page from the one or more candidate known phishing web pages, based on having a highest probability, among the one or more candidate known phishing web pages, that the suspected web page comprises the known phishing web page;

determining if the estimated probability of the selected phishing web page exceeds a probability threshold; and responsive to exceeding the probability threshold, taking a security action to prevent actuation of the phishing web page.

6. The method of claim 5, wherein the estimated probability is from a Bayesian Classifier.

7. The method of claim 5, wherein the similarity index calculation is based at least in part on a Jaccard similarity coefficient.

8. The method of claim 5, wherein the estimated probability is based at least in part on a Hamming distance.

9. A network device for web site phishing detection using machine learning of web site similarity without dependence on web site similarity thresholds, the network device comprising:

a processor;

a network interface communicatively coupled to the processor and to a Wireless Local Area Network (WLAN); and a memory, communicatively coupled to the processor and storing:

a page similarity module to calculate a similarity index from characteristics of a suspected phishing web page to a database of known phishing web pages, wherein the characteristics derive from both Hyper Text Markup Language (HTML) tags of the suspected phishing web page and a screenshot of the suspected phishing web page;

a phishing probability module to estimate, with machine learning using the similarity index as an input, a probability that the suspected web page comprises each of one or more candidate known phishing web pages from the database of known phishing web pages;

a phishing page selection module to select a known phishing web page from the one or more candidate known phishing web pages, based on having a highest probability, among the one or more candidate known phishing web pages, that the suspected web page comprises the known phishing web page;

a probability threshold module to determine if the estimated probability of the selected phishing web page exceeds a probability threshold; and a security action module to, responsive to exceeding the probability threshold, take a security action to prevent actuation of the web page.

10. The network device of claim 9, wherein the estimated probability is from a Bayesian Classifier.

11. The network device of claim 9, wherein the similarity index calculation is based at least in part on a Jaccard similarity coefficient.

12. The network device of claim 9, wherein the estimated probability is based at least in part on a Hamming distance.

* * * * *